(12) United States Patent
Mundada et al.

(10) Patent No.: US 7,469,353 B2
(45) Date of Patent: Dec. 23, 2008

(54) POWER SEQUENCING

(75) Inventors: Gopal Mundada, Olympia, WA (US); Eugene Nelson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 11/241,625

(22) Filed: Sep. 30, 2005

(65) Prior Publication Data

US 2007/0079162 A1    Apr. 5, 2007

(51) Int. Cl.
G06F 1/26 (2006.01)
G06F 1/30 (2006.01)

(52) U.S. Cl. .................. 713/330; 713/300; 713/340; 327/143; 327/535

(58) Field of Classification Search .......... 713/300, 713/330, 340; 327/143, 535
See application file for complete search history.

(56) References Cited

U.S. PATENT DOCUMENTS

| | | | | |
|---|---|---|---|---|
| 5,973,485 | A * | 10/1999 | Kates et al. | 323/272 |
| 6,333,650 | B1 * | 12/2001 | Amin et al. | 327/143 |
| 6,792,553 | B2 * | 9/2004 | Mar et al. | 713/330 |
| 6,879,139 | B2 * | 4/2005 | Brown et al. | 323/299 |
| 7,253,625 | B2 * | 8/2007 | Trabbic et al. | 324/322 |

* cited by examiner

Primary Examiner—Abdelmoniem Elamin
(74) Attorney, Agent, or Firm—Schubert Osterrieder & Nickelson PLLC; Jeffrey S. Schubert

(57) ABSTRACT

Methods and arrangements to establish power rails for a computer system in accordance with a sequence requirement are disclosed. Embodiments may interconnect voltage regulators for components of a platform in accordance with a sequence requirement for establishing power rails for proper operation of the platform. The voltage regulators may comprise enable inputs for enabling the establishment of power rails and power good signal outputs to indicate establishment of power rails. Some embodiments include interconnections to couple voltage regulators in a series of stages. Power good signals output by voltage regulators in one stage may enable inputs of voltage regulators in a subsequent stage. In many embodiments, such interconnections advantageously implement power sequence requirements with little or no need for glue logic and/or programmable logic devices, reducing costs and space requirements associated with implementing the power sequence. Other embodiments are disclosed and claimed.

30 Claims, 5 Drawing Sheets

POWER SEQUENCING

FIELD

The present invention is in the field of computer systems. More particularly, the present invention relates to methods and arrangements to establish power rails for a computer system in accordance with a sequence requirement.

BACKGROUND

Early computer motherboards implemented a single voltage level, typically 5 volts, for use by the processor, chipset, and other components on the motherboard. As technologies for semiconductors scale down, designers scale voltage levels to reduce heat generation and power consumption. For instance, the voltages for power rails throughout the motherboard reduced from 5 volts to 3.3 volts. Newer components such as chipsets and processors operate at even lower voltages by using what is called a dual voltage, or split power rail design, which allows the internal components to operate at different voltage levels than interfaces for external components.

The transition from a single voltage level to multiple voltage levels led to the necessity of multiple voltage regulators on modern motherboards. The voltage regulators reduce the 5 volts signal to those voltages typically utilized by components such as 3.3 volts, 2.8 volts, 2.5 volts, 1.8 volts, and/or 1.5 volts. However, designers found that the increasing complexity of the platform design has led to conflicts between and within the components if the power rails are not established in a particular sequence.

The current solution for satisfying a design-dependent sequence requirement is to design logic such as discrete logic or to program programmable logic devices (PLDs) to coordinate powering of the power rails. The logic powers the power rails in accordance with the sequence requirement by enabling voltage regulators in a pre-determined order to assure that the platform operates properly. For example, sequence requirements of modern platforms typically require the power rails of a processor's core to be established after establishing the power rails for the processor's input-output (I/O) interface so the logic transmits an enable signal to the voltage regulator for the processor's I/O interface, awaits a power good signal from the voltage regulator, which is indicative of stabilization of the power rails for the processor's I/O interface, and then enables the voltage regulator for the processor's core. Sequence requirements of modern platforms typically require the power rails for a chipset core to be established before an I/O interface for the chipset.

Motherboards may include one or more discrete logic devices and/or PLDs to implement the pre-determined order for power rails. The problems with the current solution are that adding such logic devices adds cost to the design and consumes valuable board space to mount and to form connections between the logic device(s) and the voltage regulators for the platform. Further, designers spend a significant number of man-hours designing, programming, and debugging the logic.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to establish power rails for a computer system or platform in accordance with a sequence requirement are contemplated. Embodiments may interconnect voltage regulators for components of a platform in accordance with a sequence requirement for establishing power rails for proper operation of the platform. The voltage regulators may comprise enable inputs for enabling the establishment of power rails and power good signal outputs to indicate establishment of power rails. In some embodiments, interconnections are formed on a circuit board to couple voltage regulators in a series of stages. Power good signals output by voltage regulators in one stage may couple with enable inputs of a voltage regulator in a subsequent stage in an order based upon the sequence requirement. In several embodiments, stages may include two or more voltage regulators may be connected in parallel. In other embodiments, the voltage regulators may be connected in series. In many embodiments, such interconnections advantageously implement power sequence requirements with little or no need for glue logic and/or programmable logic devices, reducing costs and space requirements associated with implementing the power sequence.

Many embodiments comprise a clock driver. The clock driver may be enabled after power rails for one or more of the chipset components are established. Further embodiments generate a system power good signal after establishing power rails in accordance with the sequence requirement to initiate initial program loads (IPLs). Some of these embodiments generate the system power good signal upon expiration of a delay after establishing power rails.

While portions of the following detailed discussion describes embodiments of the invention with reference to particular orders and sequence requirements for specific platforms, persons of ordinary skill in the art will recognize that embodiments may be implemented on other platforms with different sequence requirements.

Figure 1:
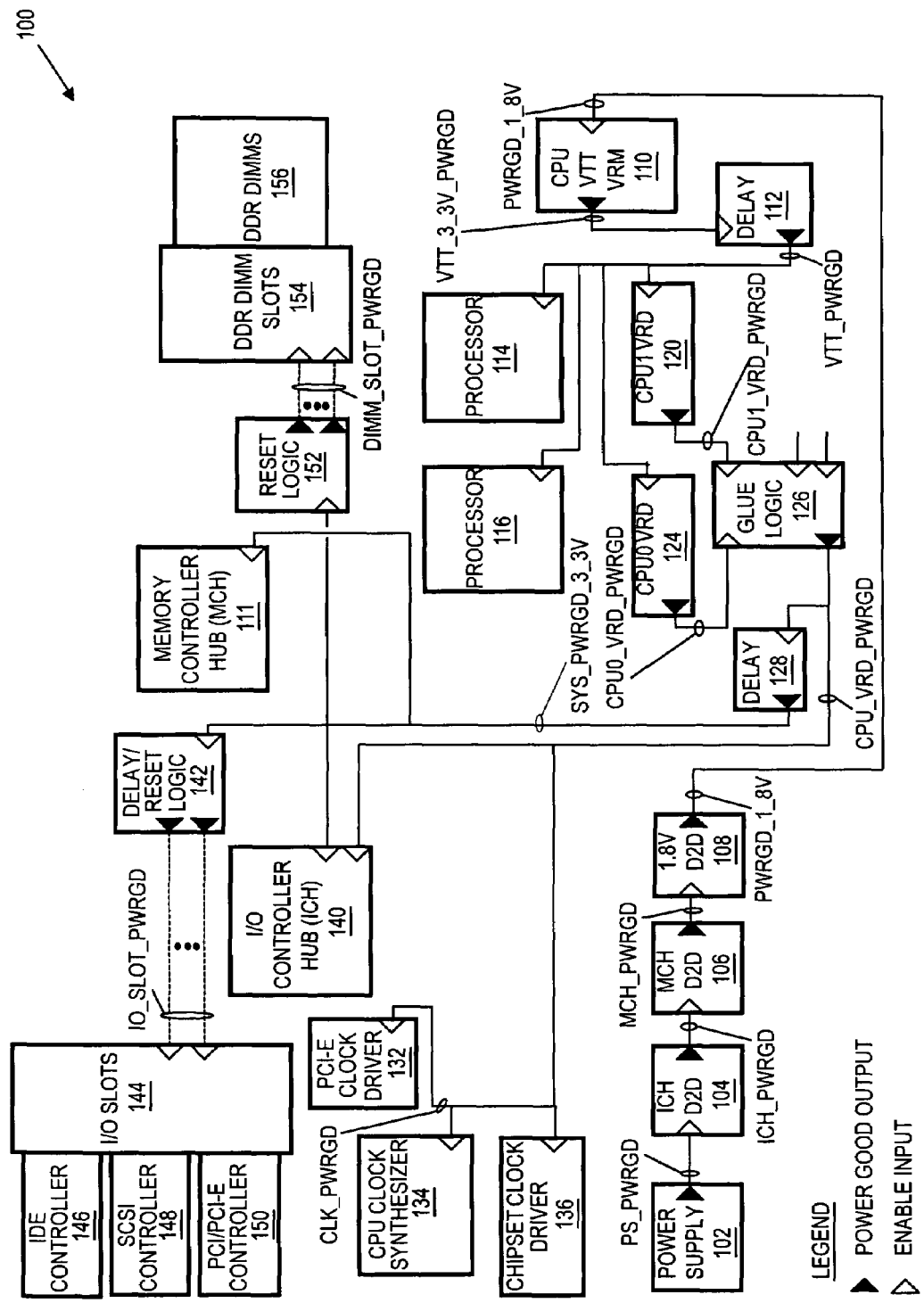
FIG. 1 depicts an embodiment of a system including a processor, a chipset, other platform logic, and a clock driver interconnected to ensure establishment of power rails in accordance with a power sequence.

Turning now to the drawings, FIG. 1 illustrates an embodiment of a system 100 that includes one or more circuit boards to mount and interconnect a power supply 102 with components such as processors 114 and 116, a memory controller hub (MCH) 111, an input-output controller hub (ICH) 140, and the like to power the components in an order based upon a sequence requirement for system 100. For instance, the power rails for power supply 102 are established prior to enabling other components of system 100. Once the power rails for the power supply are established, which is typically identified by substantial stabilization of the voltages of the power rails at steady-state levels, power supply 102 outputs a power good signal, PS_PWRGD, to initiate a first stage of a powering sequence. The powering sequence is designed to establish power rails for components in an order, which is based upon the sequence requirement. In particular, the powering sequence involves powering sets of components in stages to enforce the sequence requirement although not every component associated with the stages may be subject to the sequence requirement.

The first stage of the powering sequence for the present embodiment establishes power rails for direct current to direct current (D2D) voltage level converters 104, 106, and 108. More specifically, upon receipt of PS_PWRGD from power supply 102, ICH D2D 104 is enabled and begins to establish a new power rail at a direct current (DC) voltage level that is converted from an input DC voltage. For example, power supply 102 may connect a 5 volt output with an input of ICH D2D 104 and, when enabled, ICH D2D 104 generates a 1.5 volt power rail for ICH 140. After the 1.5 volt power rail stabilizes, ICH D2D 104 may output a power good signal, ICH_PWRGD. The state of ICH_PWRGD is indicative of establishment of the 1.5 volt power rail.

MCH D2D 106 may be a DC to DC voltage level converter that outputs a 1.5 volt power rail for MCH 111. ICH_PWRGD is received by MCH D2D 106 at an enable input, to enable MCH D2D 106 in response to the power good signal from ICH D2D 104. In some embodiments MCH D2D 106 may generate the 1.5 volt output based upon a 5 volt power rail input from power supply 102. In the present embodiment, when ICH D2D 104 outputs the power good signal, ICH_PWRGD, MCH D2D 106 is enabled by the signal and begins to convert the DC voltage level of an input power rail. Upon establishing the 1.5 volt power rail for MCH 111, MCH D2D 106 outputs a power good signal, MCH_PWRGD, to enable a 1.8 volt D2D 108. 1.8 volt D2D 108 may then output a power good signal, PWRGD_1_8V, when a 1.8 volt power rail is established to initiate a second stage of the powering sequence.

In the second stage of the powering sequence, a central processing unit (CPU) termination voltage (VTT) voltage regulator module (VRM) 110 receives the power good signal, PWRGD_1_8V, and, in response, enables CPU VTT VRM 110 and generates a power good signal, VTT_3_3V PWRGD, to a delay circuit 112.

Delay circuit 112 may initiate a count upon receipt of the power good signal and generate a second power good signal, VTT_PWRGD, upon expiration of the count. For example, delay circuit 112 may implement a 1 millisecond to 10 millisecond delay based upon an input or a setting. In other embodiments, delay circuit 112 may implement a fixed delay.

Delay 112 output VTT-PWRGD which is used, to enable voltage regulator downs (VRDs) 120 and 124 for processors 114 and 116 to initiate a third stage of the powering sequence. In the third stage, voltage regulators downs 120 and 124 may lower DC voltage levels of input power rails for use by cores of processors 114 and 116, respectfully. For example, CPU1 VRD 120 may reduce a 5 volt power rail input from power supply 102 to a 2.5 volt power rail for the core of processor 114 and output a power good signal, CPU1_VRD_PWRGD, upon establishing the 2.5 volt power rail. Similarly, CPU0 VRD 124 may reduce a 5 volt power rail input from power supply 102 to a 2.5 volt power rail for the core of processor 116 and output a power good signal, CPU0_VRD_PWRGD, upon establishing the 2.5 volt power rail.

A glue logic 126 may receive the power good signals, CPU0_VRD_PWRGD and CPU1_VRD_PWRGD, and may generate another power good signal, CPU_VRD_PWRGD based upon the power good signals, CPU0_VRD_PWRGD and CPU1_VRD_PWRGD. In some embodiments, glue logic 126 may determine the number of processors actually mounted and await power good signals from each of the mounted processors prior to outputting CPU_VRD_PWRGD. In other embodiments, glue logic 126 may take into consideration the state of additional or other signals.

The power good signal, CPU_VRD_PWRGD, may initiate fourth and fifth stages of the powering sequence. In the fourth stage, receipt of the power good signal, CPU_VRD_PWRGD, may enable a Peripheral Component Interconnect Express (PCI-E) clock driver 132, a CPU clock synthesizer 134, and a chipset clock driver 136. For PCI-E clock driver 132 may be a clock driver such as a DB800 clock driver chip to drive a clock signal for synchronizing data transfers between a graphics accelerator card (not shown) and MCH 111.

CPU clock synthesizer 134 may be a clock synthesizer chip such as clock synthesizer chip CK410B for processors 114 and 116 to synchronize transactions across the front-side bus. And chipset clock driver 136 may be a clock driver chip for a chipset such as a DB1200G clock driver chip.

In the fifth stage, delay circuit 128 receives the power good signal, CPU_VRD_PWRGD, and, in response, initiates a delay count. Upon expiration of the delay count, delay circuit 128 outputs a platform power good signal, SYS_PWRGD_3_3V.

The platform power good signal, SYS_PWRGD_3_3V, may be fed to ICH 140, a delay/reset logic 142, and a reset logic 152. Receipt of the platform power good signal by ICH 140 may enable ICH 140. Receipt of the platform power good signal by delay/reset logic 142 may enable I/O slots 144 after a delay via a power good signal, IO_SLOT_PWRGD, in the absence of a reset signal. For instance, I/O slots 144 may respond to IO_SLOT_PWRGD by establishing communications from an IDE controller 146, a SCSI controller 148, and a PCI/PCI-E controller 150 to ICH 140 to facilitate upbound and downbound transactions with I/O devices.

Reset logic 152 may enable double data rate (DDR) dual inline memory module (DIMM) slots 154 via a power good signal, DIMM_SLOT_PWRGD. Enabling DDR DIMM slots 154 may enable access of DDR DIMMs 156 by MCH 111.

Figure 2:
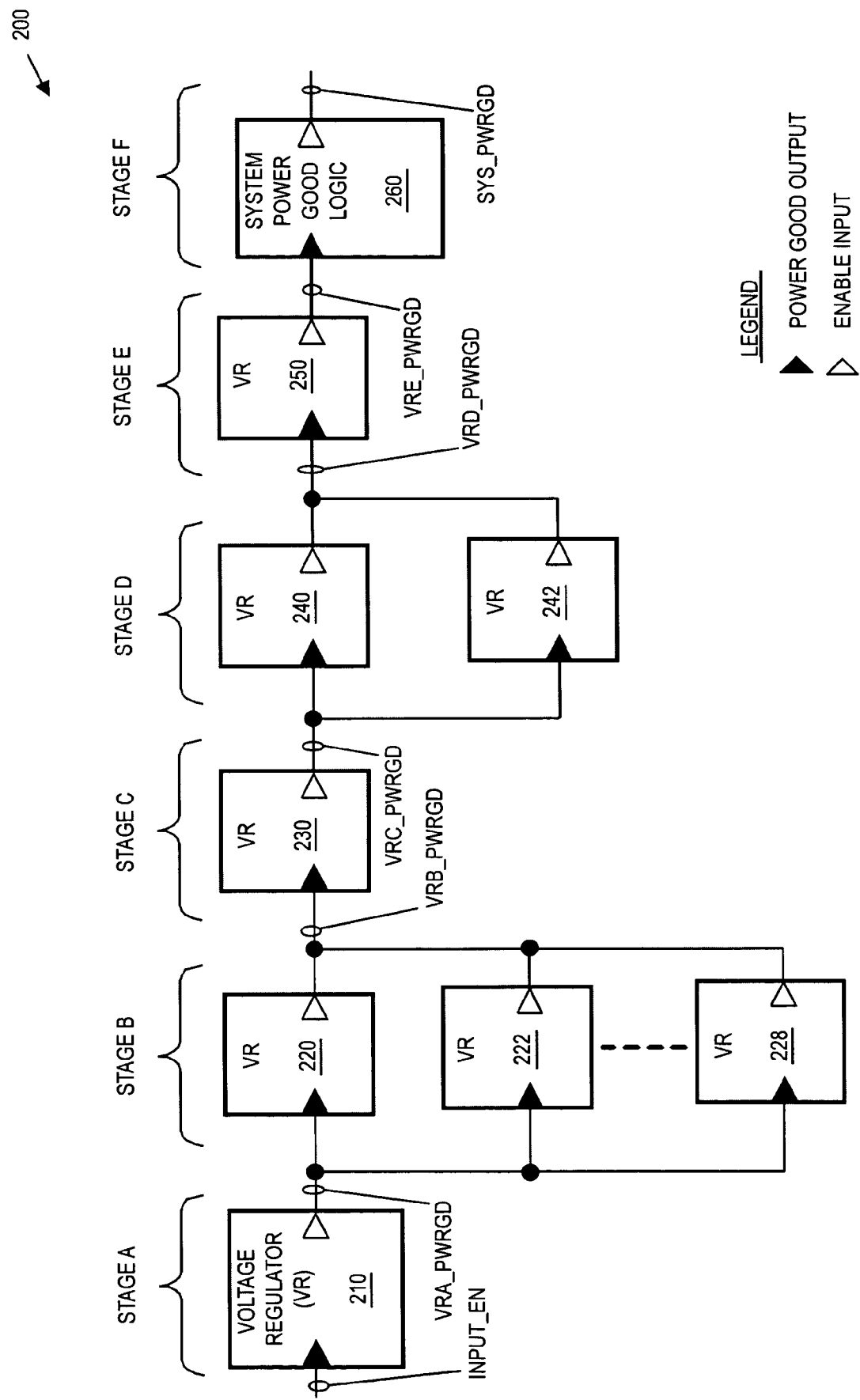
FIG. 2 depicts an embodiment of voltage regulators for components of a platform.

FIG. 2 depicts an embodiment of voltage regulators (VRs) for components of a platform 200. The powering sequence for the platform is an order that starts with stage A and ends after stage F with a platform power good signal, SYS_PWRGD. FIG. 2 focuses on components that establish power rails associated with a powering sequence or order that is based upon a sequence requirement for the platform 200. For instance, some embodiments may include other logic in series and/or in parallel with voltage regulators depicted in FIG. 2.

The powering sequence for platform 200 begins with a VR 210 in stage A. An initial enable signal, INPUT_EN, enables VR 210 and, in response, VR 210 begins to establish a power rail. Upon establishing the power rail, VR 210 produces an output signal, VR_PWRGD, which is indicative of establishment of the power rail. In some embodiments, the initial enable signal may, for instance, comprise or be based upon a power good signal produced by a power supply. In further embodiments, the initial power good signal may be based upon an output from other logic.

Stage B comprises VR 220 and VR 222 through VR 228. VR 220 and VR 222 through VR 228 all have their respective enable inputs connected in parallel to the output, VR_P-WRGD of VR 210. As a result of this interconnection, VR 220 and VR 222 through VR 228 are enabled when VR 210 establishes the power rail and VR_PWRGD is driven high by VR210.

The outputs of VR 220 and VR 222 through VR 228 are connected via a wired "OR", which produces a power good signal VRB_PWRGD when all of the VRs 220 and 222 through 228 establish power rails and outputs power good signals. For example, if logical zeros are output by VR 220 and VR 222 through VR 228 when their corresponding power rails are established, the wired "OR" will output a logical zero once all of these power rails are established. On the other hand, for embodiments in which a logical one is output in response to establishing a power rail, the wired "OR" will output a logical one when the power rails are established. VRB_PWRGD will be high when VR 220, VR 222 through VR 228 all have stable power and all power good signals are driven high.

Stage C begins in response to receipt of VRB_PWRGD. Stage C produces a power good output signal, VRC_PWRGD, once VR 230 establishes a power rail.

Stage D comprises VR 240 and VR 242. Both VR 240 and VR 242 receive VRC_PWRGD at substantially the same time and responsively begin to establish power rails for platform 200. Similar to stage B, the outputs of VR 240 and VR 242 electrically connect to form a wired "OR" logic that outputs a power good signal, VRD_PWRGD, based upon a power good signal output from VR 240 and VR 242. In other embodiments, discrete logic may be utilized in place of the wired "OR" logic. In further embodiments, other logic may be implemented and/or further signals may be utilized to determine the signals to input into one or more of the stages.

In stage E, VR 250 receives the power good signal at an enable input and, in response, enables establishment of a power rail. Once VR 250 establishes the power rail, VR 250 produces a power good signal, VRE_PWRGD.

The power good signal, VRE_PWRGD, enables system power good logic 260 of stage F. System power good logic 260 may output a platform power good signal, SYS_PWRGD, which is indicative of establishment of at least the power rails necessary for operation of platform 200. For example, the output of SYS_PWRGD may trigger the initial program loads (IPLs) to begin the process of booting platform 200.

In some embodiments, system power good logic 260 may comprise delay circuitry to ensure that key power rails have substantially reached steady-state voltage levels. In further embodiments, system power good logic 260 may base the output of SYS_PWRGD signals other than and/or in addition to signal VRE_PWRGD. In other embodiments, system power good logic 260 may comprise logic such as AND, OR, NAND, NOR, and/or other logic.

While stages A through F may order the establishment of power rails to meet a sequence requirement, one or more of the components associated with the stages may be powered in this order for convenience rather than out of necessity. For example, the sequence requirement may force VR 228 to be powered prior to powering VR 250 and after powering VR 210. In such embodiment, VR 228 may be powered at any stage between stage A and stage E.

As a further illustration, VR 222 may not be subject to the sequence requirement for platform 200. For instance, the power rail(s) established by VR 222 may be for an auxiliary input-output device, which does not effect the operation of other components of platform 200. Thus, the power rail(s) of VR 222 may be established before, during, or after booting platform 200.

In a further embodiment, monitor logic may receive the power good signals for one or more of the stages to monitor the powering sequence. The monitor logic may output an indication of the sequence of establishing power rails, the timing for establishing the power rails, and/or the like. For instance, in the event of a failure of one of the VRs to produce a power good signal, the monitor logic may report the list of power good signals generated to indicate the location of the faulty VR.

Figure 3:
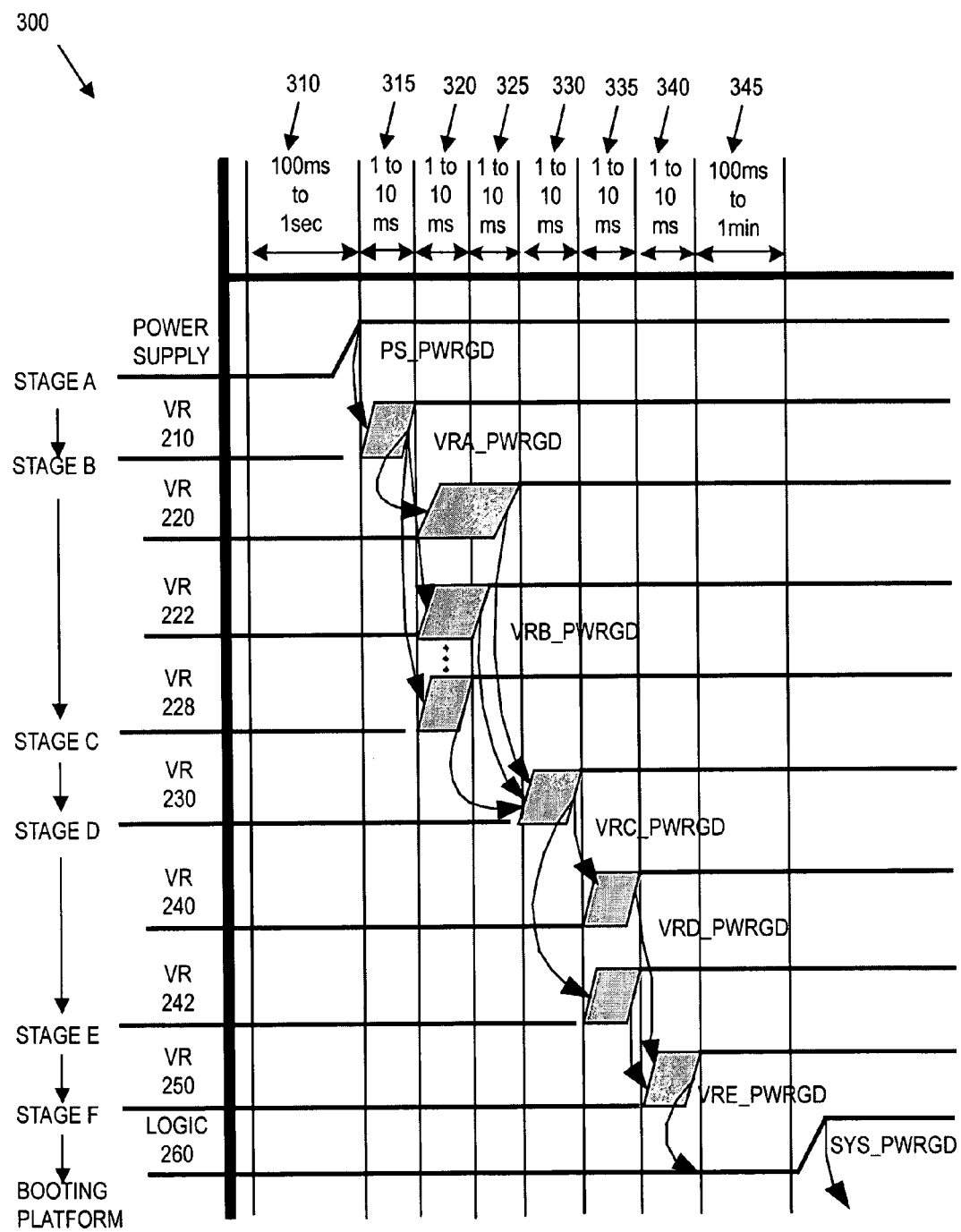
FIG. 3 depicts an embodiment of a powering sequence/timing diagram for a platform such as the platform illustrated in FIG. 2.

FIG. 3 depicts an embodiment of a powering sequence/timing diagram 300 for a platform such as platform 200 illustrated in FIG. 2. In this embodiment, the input enable signal is a power good signal, PS_PWRGD, generated by the power supply. As column 310 indicates, the power supply takes between 100 milliseconds and 1 second to establish a power rail and once the power rail is established, the power supply generates the power good signal, PS_PWRGD. The power good signal, PS_PWRGD, enables VR 210 to initiate stage A.

When a power rail is established by VR 210 after about 1 to 10 milliseconds according to column 315, VR 210 generates a power good signal, VR_PWRGD. The power good signal, VR_PWRGD, is transmitted to VR 220 and VR 222 through VR 228 of stage B. Prior to establishing power rails, VR 220 and VR 222 through VR 228 maintain their respective power good outputs at a logical zero. Thus, the wired "OR" interconnection between the power good outputs from VR 220 and VR 222 through VR 228 combine to be a logical zero until all the power rails for VR 220 and VR 222 through VR 228 are established. Once all the power rails are established, which takes approximately 1 to 20 milliseconds in accordance with columns 320 and 325, the wired "OR" arrangement produces a logical one output for VRB_PWRGD to enable VR 230 of stage C.

As indicated in column 330, VR 230 establishes a power rail within 1 to 10 milliseconds of enablement by VRB_PWRGD and then generates a power good signal, VRC_PWRGD. The power good signal VRC_PWRGD enables VR 240 and VR 242 of stage D. VR 240 and VR 242 establish power rails within 1 to 10 milliseconds as indicated by column 335 and then the wired "OR" produces a combined power good signal VRD_PWRGD.

The combined power good signal, VRD_PWRGD, enables VR 250 to initiate stage E of the powering sequence. VR 250 establishes a power rail in 1 to 10 milliseconds in accordance with column 340 and enables logic 260 of stage F via a power good signal VRE_PWRGD. Within 100 milliseconds to 1 minute as indicated by column 345, logic 260 produces a platform power good signal, SYS_PWRGD, which boots platform 200.

Note that the time periods indicated in column 310 through 345 are for illustrative purposes. Time periods associated with the stages are dependent upon the components enabled in the stages and may vary significantly between various embodiments from those indicated in FIG. 3.

Figure 4:
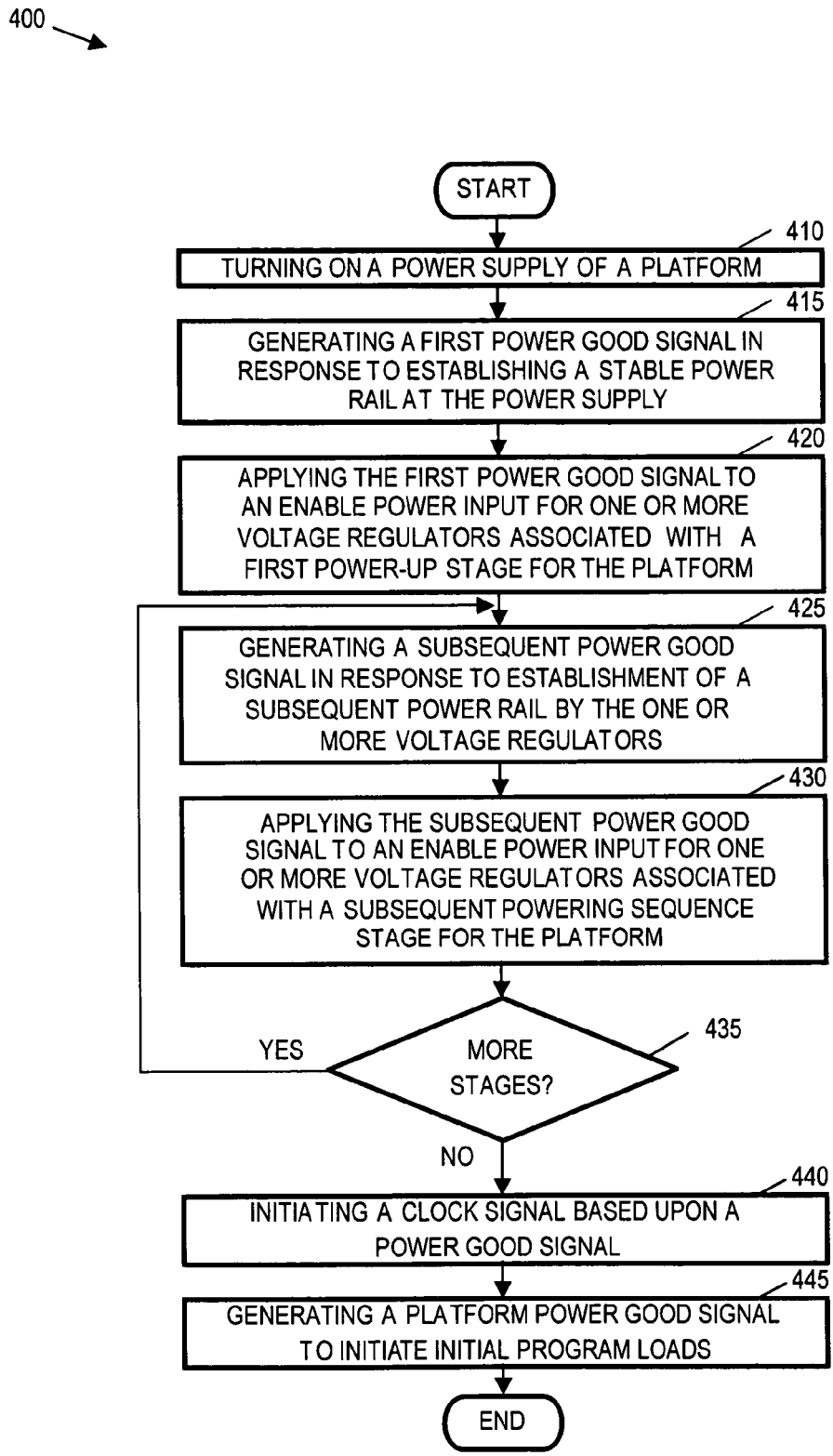
FIG. 4 depicts a flowchart of an embodiment to establish power rails in accordance with a powering sequence requirement.

FIG. 4 depicts a flowchart 400 of an embodiment to establish power rails in accordance with sequence requirement for a platform. In particular, flowchart 400 describes turning on a power supply of the platform (element 410). The power supply may be one of a number of power supplies or may be a single power supply designed to handle the power requirements of the platform. In some embodiments, the power supply may supply one or more positive and negative voltages to power components of the platform.

When turned on, the power supply begins to convert power from an alternating current power source into one or more DC power rails such as 12 volts, 5 volts, and the like. Upon establishing, for instance, a stable 5 volt power rail, the power supply may generate a power good signal to initiate the first stage of a powering sequence to power components of the platform in an order based upon the sequence requirement for the platform (element 415). For instance, in response to establishing the power rail, the power supply may transition an output for the power supply power good signal from a logical zero to a logical one.

One or more circuit boards of the platform interconnect the output for the power supply power good signal with an enable power input for one or more voltage regulators associated with a first stage of the powering sequence. As a result, when the power supply power good signal transitions from a logical zero to a logical one, the interconnections in the one or more circuit boards apply the logical one to the enable power inputs of the one or more voltage regulators (element 420), which enables the one or more voltage regulators.

Upon enabling the one or more voltage regulators, the one or more voltage regulators begin to establish component power rails. When the component power rails substantially stabilize at steady-state DC voltage levels, the one or more voltage regulators generate a component power good signal (element 425) and the component power good signal for the first stage of components propagates to a subsequent stage of the powering sequence to apply the component power good signal to components associated with the subsequent stage for the platform (element 430).

Elements 425 and 430 repeat for additional stages, if there are more stages (element 435). Once power rails associated with the stages of the powering sequence are substantially established, one or more clock drivers and/or clock synthesizers may be enabled via one of the component power good signals (element 440). In other embodiments, the one or more clock drivers and/or clock synthesizers may be initiated in parallel with one or more of the stages of the powering sequence.

After at least the necessary power rails are established and the clock signals are generated for, e.g., the front-side bus, the processors, the chipset, and/or the like, system logic may generate a platform power good signal to indicate that the platform is ready to boot (element 445).

Figure 5:
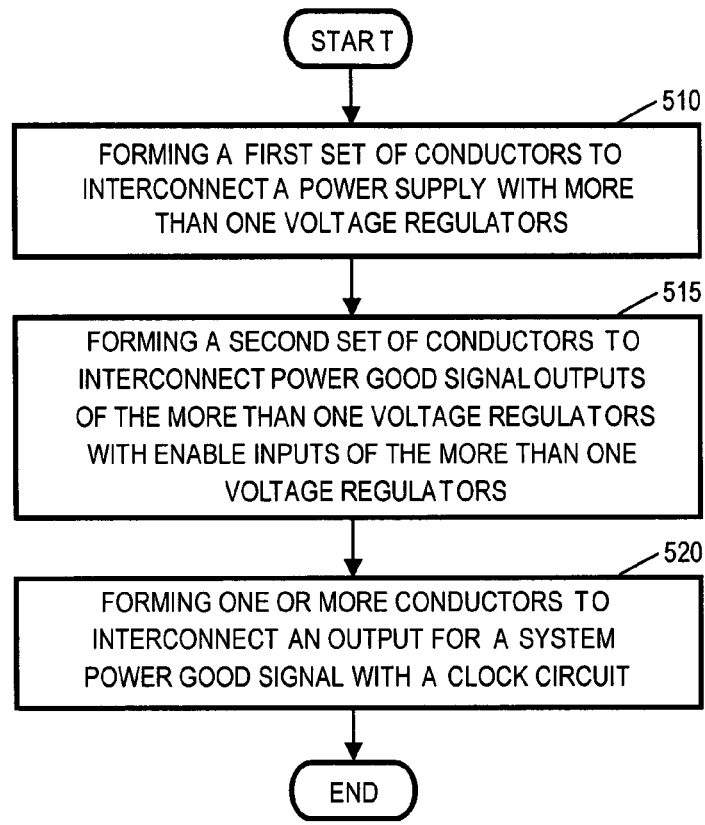
FIG. 5 depicts a flowchart of an embodiment to form interconnections on a circuit board to establish power rails in accordance with a powering sequence requirement.

FIG. 5 depicts a flowchart 500 an embodiment to form interconnections on a circuit board to establish power rails in accordance with a powering sequence requirement. In particular, flowchart 500 describes forming a first set of conductors to interconnect a power supply with more than one voltage regulators, to supply power to the more than one voltage regulators (element 510). Element 515 further describes forming a second set of conductors to interconnect power good signal outputs of the more than one voltage regulators with enable inputs of the more than one voltage regulators to enable the more than one voltage regulators to establish power rails in an order based upon a sequence required for establishment of the power rails for the platform. For instance, stand alone voltage regulators or voltage regulators integrated into components of the platform may be associated with an order based upon a sequence requirement for the platform by associating the components with stages of a powering sequence. Then, enabling each stage of the powering sequence in the appropriate order ensures that the order in which power rails are established for the components are in accord with the sequence requirement.

To enable each stage in the appropriate order, interconnections are formed on the circuit board to connect the power good output of an earlier stage in the sequence with an enable input of a voltage regulator in a latter stage of the sequence. Each stage may then be connected in this series of stages to ensure that, regardless of the timing involved with establishing power rails a particular stage, the subsequent stage will not be enabled until the power rails are sufficiently stabilized to generate a power good signal output.

In addition to forming interconnections for the voltage regulators, conductors may be formed to interconnect an output for a system power good signal with a clock circuit to enable the clock circuit (element 520). The system power good signal may be indicative of the establishment of the more than one power rails associated with the sequence requirement so the clock circuit may be enabled to establish communications busses between the components such as the front-side bus or a high speed serial bus.

One or more conductors may also be formed on the circuit board to interconnect the output for the system power good signal with a delay circuit and couple with an output of the delay circuit. Such interconnections facilitate transmission of a platform power good signal responsive to the system power good signal after a delay to other components of the platform to, e.g., boot the platform.

Another embodiment of the invention is implemented as a program product for use with a system to perform processes such as the processes described in conjunction with flowcharts 400 and 500 as illustrated in FIGS. 4 and 5. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates systems and arrangements to establish power rails for a computer system in accordance with a sequence requirement. It is understood that the form of the invention shown and described in the detailed description and the drawings are to be taken merely as examples. It is intended that the following claims be interpreted broadly to embrace all the variations of the embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    applying power to a first element of more than one elements of a platform in accordance with an order established for the more than one elements, the order being, based upon a sequence requirement for establishing power rails of the more than one elements on the platform;
    generating, by the first element, a power good signal indicative of establishment of at least one of the power rails at the first element; and
    applying the power good signal to an enable input of a subsequent element of the elements in accordance with the order to apply power to the subsequent element.

2. The method of claim 1, further comprising applying power to the first element upon establishing the power rails at a power supply.

3. The method of claim 1, further comprising generating a, system power good signal by another element upon establishing the power rails, generating a platform good signal after generating the system power good signal and a fixed delay, and booting the platform in response to generating the platform power good signal.

4. The method of claim 3, further comprising establishing a clock signal after generating the system power good signal.

5. The method of claim 3, further comprising establishing a platform power good signal after generating the system power good signal and upon expiration of a selected delay.

6. The method of claim 1,. wherein applying power to the first element comprises applying power to more than one of the elements in substantially in parallel.

7. The method of claim 6, wherein generating, by the first element, the power good signal comprises generating the power good signal and at least one other power good signal.

8. The method of claim 7, wherein applying the power good signal comprises applying the power good signal upon generating the power good signal and the at least one other power good signal.

9. The method of claim 1, wherein generating, by the first element, the power good signal comprises determining by a voltage regulator of the first element that the at least one of the power rails is substantially stable.

10. The method of claim 1, wherein applying the power good signal comprises applying the power good signal to the subsequent element and a third element of the elements substantially in parallel in accordance with the order.

11. The method of claim 1, wherein applying the power good signal comprises enabling a voltage regulator of the subsequent element.

12. A circuit board comprising:
    a first set of conductors to interconnect a power supply with more than one voltage regulators, to supply power to the more than one voltage regulators; and
    a second set of conductors, the second set of conductors to interconnect power good signal outputs of the more than one voltage regulators with enable inputs of the more than one. voltage regulators to enable the more than one voltage regulators to establish power rails in an order based upon a sequence required for establishment of the power rails for the platform.

13. The circuit board of claim 12, further comprising one or more conductors to interconnect an output for a system power good signal with a clock circuit to enable the clock circuit, the system power good signal being indicative of the establishment of the more than one power rails.

14. The circuit board of claim 13, wherein the one or more conductors interconnect the output for the system power good signal with a delay circuit and couple with an output of the delay circuit to transmit a platform power good, signal responsive to the system power good signal after a delay.

15. The circuit board of claim, 12, wherein the second set of conductors couple the more than voltage regulators in series.

16. The circuit board of claim 12, wherein the second set of conductors couple a number of the more than one voltage regulators in parallel.

17. The circuit board of claim 15, wherein the second set of conductors interconnect the power good signal outputs of the number of the more than one voltage regulators via a wired OR.

18. A platform comprising:
    a first voltage regulator to regulate power for a first circuit of the platform and to generate a first power good signal in response to substantial stabilization of at least one power rail of more than one power rails for the platform, wherein the first voltage regulator is to establish the at least one power rail in an order based upon a sequence required for establishment of the more than one power rails for the platform;
    a second voltage regulator to regulate power for a second circuit of the platform, wherein a second voltage regulator is to generate a second power good signal in response to establishing another power rail of the more than one power rails; and
    a circuit board to interconnect an output of the first voltage regulator with an enable input of the second voltage regulator to transmit the first power good signal to enable the second voltage regulator in accordance with the order.

19. The platform of claim 18, further comprising a power supply to supply power to the circuits via the voltage regulators.

20. The, platform of claim 18, wherein the first voltage regulator and second voltage regulator are to regulate power to a chipset, the first circuit being a chipset core and the second circuit being a chipset input-output interface.

21. The platform of claim 18, wherein the first voltage regulator and second voltage regulator are to regulate power to a processor, the first circuit being a processor input-output interface and the second circuit being a processor core.

22. The platform of claim 18, further comprising additional voltage regulators coupled with the second voltage regulator to receive the second power good signal, wherein the additional voltage regulators are enabled based upon the second power good signal.

23. The platform of claim 22, wherein the additional voltage regulators are cascaded via power good signal outputs and enable signal inputs in series to enable the additional voltage regulators in accordance with the order.

24. The platform of claim 22, wherein the additional voltage regulators are coupled in parallel to enable the additional voltage regulators.

25. The platform of claim 22, wherein the additional voltage regulators generate a system power good signal after generating power good signals indicative of establishing each of the more than one power rails.

26. The platform of claim 22, further comprising a clock circuit coupled with the second voltage regulator to enable the clock circuit after the establishment of the more than one power rails.

27. The platform of claim 22, further comprising logic to generate a platform power good signal after the establishment of the more than one power rails.

28. A machine-accessible, tangible medium containing instructions, which when executed by a machine, cause the machine to perform operations, the operations comprising:
    forming a first set of conductors, to interconnect a power supply with more than one voltage regulators, to supply power to the more than one voltage regulators; and
    forming a second set of conductors to interconnect power good signal outputs of the more than one voltage regulators with enable inputs of the more than one voltage regulators to enable the more than one voltage regulators to establish power rails in an order based upon a sequence required for establishment of the power rails for the platform.

29. The machine-accessible, tangible medium of claim 28, wherein the operations further comprise forming one or more conductors to interconnect an output for a system power good signal with a clock circuit to enable the clock circuit, the system power good signal being indicative of the establishment of the more than one power rails.

30. The machine-accessible, tangible medium of claim 28, wherein forming the second set of conductors to interconnect the power good signal outputs of the number of the more than one voltage regulators via a wired OR.

* * * * *

UNITED STATES PATENT AND TRADEMARK OFFICE
CERTIFICATE OF CORRECTION

PATENT NO. : 7,469,353 B2  Page 1 of 1
APPLICATION NO. : 11/241625
DATED : December 23, 2008
INVENTOR(S) : Mundada et al.

It is certified that error appears in the above-identified patent and that said Letters Patent is hereby corrected as shown below:

In column 9, line 37, in Claim 1, delete "being," and insert -- being --, therefor.

In column 9, line 51, in Claim 3, delete "a," and insert -- a --, therefor.

In column 9, line 62, in Claim 6, delete "1,." and insert -- 1, --, therefor.

In column 10, line 23, in Claim 12, delete "one." and insert -- one --, therefor.

In column 10, line 35, in Claim 14, delete "good," and insert -- good --, therefor.

In column 10, line 37, in Claim 15, delete "claim," and insert -- claim --, therefor.

In column 11, line 1, in Claim 20, delete "The," and insert -- The --, therefor.

In column 12, line 7, in Claim 28, delete "conductors," and insert -- conductors --, therefor.

Signed and Sealed this

Twenty-fourth Day of March, 2009

JOHN DOLL
*Acting Director of the United States Patent and Trademark Office*